June 19, 1962  S. F. LETO ET AL  3,039,301

DYNAMIC TORQUE RESPONSE DEVICE

Filed Oct. 8, 1959

*INVENTORS*
SALVATORE F. LETO
JOSEPH LETO
BY
KENWAY JENNEY, WITTER & HILDRETH

ATTORNEYS

United States Patent Office 3,039,301
Patented June 19, 1962

3,039,301
DYNAMIC TORQUE RESPONSE DEVICE
Salvatore F. Leto, 75 College Ave., Arlington 74, Mass., and Joseph Leto, 17 Sherburne Road, Lexington 73, Mass.
Filed Oct. 8, 1959, Ser. No. 845,270
6 Claims. (Cl. 73—136)

This invention relates to torque responsive devices and provides an entirely mechanical system in which the torque transmitted by a shaft may be utilized to cause a stationary element to be displaced proportionally to the torque whether the shaft be rotating or stationary.

Numerous devices have been developed in the past for measuring the torque between a pair of shafts, or for providing some function in response to the torque. Devices that operate on purely mechanical principles have many advantages over other kinds in being simpler and more rugged, but suffer the disadvantage of being of low accuracy and of not being readily utilized for control functions.

The present invention provides a novel mechanical system which is of utmost simplicity and reliability and which operates on principles which provide for high accuracy. The responsive member of the device of this invention may be utilized as a torque indicator or as a control mechanism to effect a mechanical operation in response to the applied torque. As a torque indicator, the invention provides a compact, inexpensive assembly having a dial type indicator which is easily read.

In general the torque responsive devices of this invention make use of a differential gear train in which a floating gear is engaged between the teeth of two outer gears which are driven in opposite linear directions at the same linear speed. The floating gear will be stationary in such a system, but will be caused to shift by any change in the relative positioning of the two outer gears. Each of the outer gears is driven from one of a pair of shafts which are resiliently coupled so that they may be angularly displaced relative to each other proportional to the torque between them. With one of the outer gears of the gear train driven by one shaft and the other driven in the opposite direction, but at the same linear speed, by the other shaft, a torque within the system will cause the shafts to undergo a relative displacement. This is translated through the differential gear train to the floating gear which is shifted in one direction or the other in an amount proportional to the torque. The floating gear may be utilized to move an indicator by which the magnitude of the torque may be measured, or it may be utilized to operate some control mechanism responsive to the torque, for instance, to shift gears in an automatic transmission.

The simple mechanical principles of this system combine the rugged simplicity of mechanical devices with the accuracy and reliable, easily read response of more elaborate systems. The device is incorporated in a stationary housing, which provides for easy mounting and serves as a protective cover, and the movable member provides a station reading, or other indication, at any given torque.

This invention is described in detail below with reference to various embodiments which are illustrated in the accompanying drawings, in which.

Figure 1:
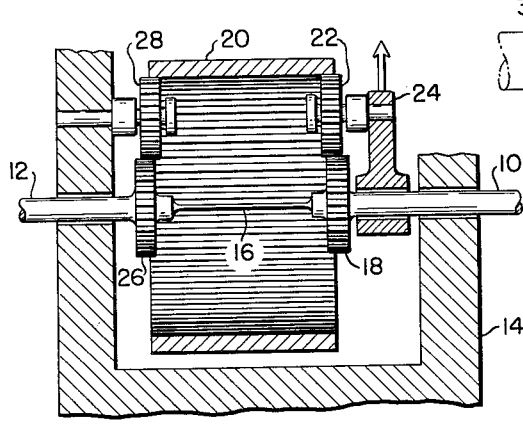
FIG. 1 is an elevation partly in longitudinal section of a simplified embodiment of the invention in more or less schematic layout.

For purposes of description it will be assumed that the torque responsive device 5 herein described will be coupled into a power transmission system between a source of power and a driven member through an input shaft 10 and an output shaft 12, which connect respectively with a power shaft 1 (FIG. 3) and a drive shaft 3 which powers the driven member. The torque measuring device 5 is assembled about a base member 14, which suitably forms the casing in the embodiments illustrated in FIGS. 2 and 3, and provides a stationary mount for the input and output shafts 10 and 12.

The basic mechanism is shown more or less schematically in FIG. 1. The input and output shafts 10 and 12 are connected together by a torsion bar 16 which permits relative angular displacement of the shafts proportional to the torque between them. Measurement of the torque is provided by means of the differential gear train made up of a first gear 18 which is driven directly by the input shaft 10, a counter gear 20 mounted (by means not shown) in opposed spaced relationship from the first gear 18, and a floating gear 22 which is mounted on a spider 24 to move freely around the first gear 18. The counter gear 20 is driven from the output shaft 12 in the direction opposite, but at the same linear speed, as the first gear, through a gear train made up of a second gear 26 which is positively driven from the output shaft, and a stationary idler 28 which is journalled to the base member 14.

In its operation, the rotation of the input shaft 10 and the output shaft 12 result in rotation of the floating gear 22 and idler 28, with the latter providing a positive drive for the counter gear 20. If there is no torque between the input and output shafts the floating gear 22 will rotate on a stationary axis without deflection from its normal position. If however the output shaft 12 is displaced relatively to the input shaft 10, the counter gear 20 will become advanced or retarded relative to the counter-rotating first gear 18, and the differential gear 22 will become displaced proportionately. This effect, it will be noted, will occur whether or not the shafts 10 and 12 are rotating, and the degree of displacement will be independent of this rotation and dependent only on the relative displacement of the input and output shafts 10 and 12.

Figure 3:
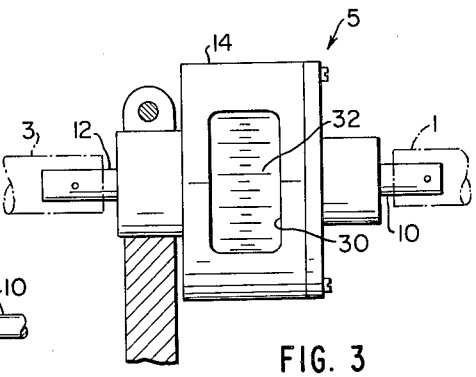
FIG. 3 is a plan view of the embodiment shown in FIG. 2 illustrating its actual use in a mechanical system.
Figure 2:
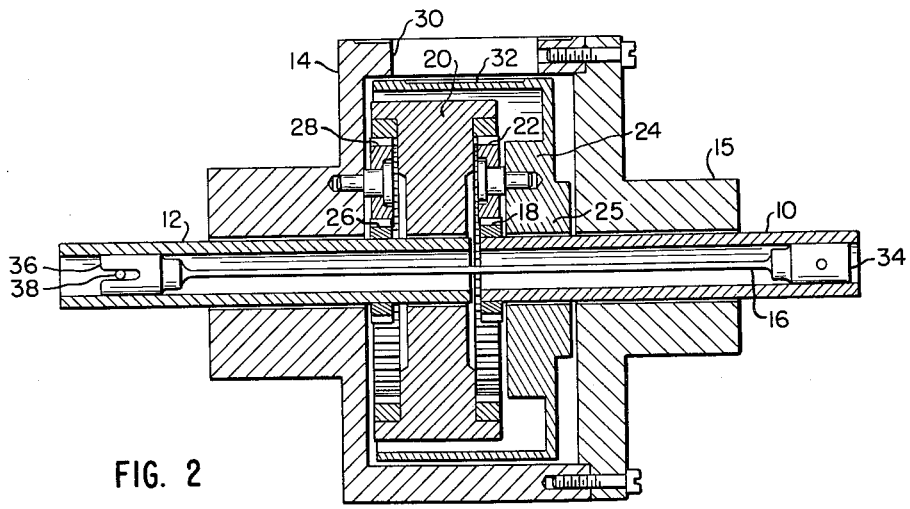
FIG. 2 is a longitudinal section through a preferred embodiment of the invention.

In the embodiment illustrated in FIGS. 2 and 3, the base member 14 takes the form of a cylindrical housing having a window portion 30 and includes a removable end bearing plate 15. The input and output shafts 10 and 12 are mounted to rotate within the housing 14 and bearing plate 15, and the counter gear 20 is formed with a central hub and mounted to rotate freely on the output shaft 12. The internal teeth of the counter gear are carried only at the outer faces on opposite sides of the hub, where they mate on one side with the stationary idler 28 and on the other with the floating gear 22. The spider 24 is formed with a hub 25 which is mounted to rotate freely on the input shaft 10 and also carries an outer cylindrical flange 32 which surrounds the counter gear 20 and lies just within the housing 14. A scaled portion of the flange 32 appears through the window 30, and an index line registering with the scale may be carried by the housing 14.

A compact resilient coupling between the input and output shafts 12 and 14 is conveniently provided by making the shafts hollow to accommodate the torsion bar 16 within them. The torsion bar is carried at one end in a bushing 34 keyed within the input shaft 10 and at the other end in a bushing 36 which is slotted to engage a transverse pin 38 carried within the output shaft 12.

The embodiment of FIGS. 2 and 3 constitutes a compact, rugged mechanism which may be easily assembled within the housing 14. The input and output shafts 10 and 12 may be mounted on ball bearings (not shown) within the bearing plate 15 and housing 14, and the counter gear 20 and spider 25 may similarly be mounted on ball bearings on the output shaft 12 and the input shaft 10 respectively. The first gear 18 and second gear 26 are securely mounted on the input and output shafts respectively, and the stationary idler 28 and the floating differential gear 22 are carried on bearing shafts mounted on the casing 14 and spider hub 25 respectively. Assembly of the unit is conveniently done by slipping the output shaft 12, on which is mounted the counter gear 20 into its bearing in the housing 14 to cause the stationary idler 28 to mate with both the second gear 26 and the counter gear 20. The input shaft 10 with the spider 24 mounted on it will similarly be inserted in the bearing plate 15 with the first gear 18 in engagement with the floating differential gear 22. The two sub-assemblies may then be combined, inserting the torsion 16 into the hollow output shaft 12 so that its groove 36 engages the pin 38. The bearing plate 15 may then be secured, e.g. by screws, to the housing 14 to complete the assembly.

From the foregoing description it will be seen that the gear train comprising the second gear 26 and stationary idler 28 provides a convenient drive for the counter gear 20. Since it is necessary for the latter gear to rotate at the same speed but in the opposite direction as the first gear 18, it will be seen that the pitch diameters of the first gear and second gear 18 and 26 respectively must be equal, and that the pitch diameters of the floating differential gear and idler 22 and 28 respectively must also be equal, in the embodiment illustrated. It will be understood however that other means of coupling the output shaft 12 to the counter gear 20 to provide a positive drive for the latter at the required speed and direction may also be used with equal effectiveness.

Although this invention has been described with reference to its presently preferred embodiment, it will be appreciated that obvious modifications will occur to those skilled in the art and familiar with this disclosure and that such may be made without departing from the scope of this invention. In particular it will be noted that gear trains other than the planetary type may be utilized to provide the necessary differential system between the first gear and the counter gear since it is only necessary that these two gears rotate in the opposite directions but at the same speed, with the latter being positively connected to the output shaft.

Having thus disclosed our invention and described in detail the preferred embodiment thereof, we claim and desire to secure by Letters Patent:

1. A torque responsive device comprising in combination, an input shaft and an output shaft resiliently coupled to said input shaft whereby said shafts may be angularly displaced relatively to each other proportional to the torque between them; a differential gear train comprising a first gear positively driven from said input shaft, an internal counter gear coaxial with and spaced from said first gear, and a floating differential gear engaged between said first gear and said counter gear; and means positively driving said counter gear from said output shaft in the direction opposite said first gear but at the same linear speed as said first gear, whereby said floating differential gear is caused to be displaced proportionally to the relative displacement of said shafts.

2. A torque responsive device comprising in combination, an input shaft and an output shaft resiliently coupled to said input shaft whereby said shafts may be angularly displaced relatively to each other proportional to the torque between them; a differential gear train comprising a first gear positively driven from said input shaft, an internal counter gear coaxial with and spaced from said first gear, and a floating differential gear engaged between said first gear and said counter gear; and means positively driving said counter gear in the direction opposite said first gear but at the same linear speed as said first gear, including a second gear positively driven by said output shaft and a stationary idler engaged between said second gear and said counter gear whereby said floating differential gear is caused to be displaced proportionally to the relative displacement of said shafts.

3. A torque responsive device comprising a stationary housing, an input shaft and an axially aligned output shaft entering said housing, said shafts being resiliently coupled together to permit relative angular displacement proportional to the torque between the shafts; a spider mounted with freedom of rotation on one of said shafts; a differential gear train comprising a first gear positively mounted on said input shaft, an internal counter gear coaxial with and spaced from said first gear, and a floating idler gear engaged between said first gear and said counter gear mounted for rotation on said spider; and means driving said counter gear in the direction opposite said first gear but at the same linear speed comprising a second gear positively mounted on said output shaft and an idler mounted on said housing and engaged between said second gear and said counter gear, whereby said floating differential gear is caused to be displaced proportionally to the relative displacement of said shafts.

4. A torque responsive device comprising a stationary housing, an input shaft and an axially aligned output shaft entering said housing, said shafts being resiliently coupled together to permit relative angular displacement proportional to the torque between the shafts; a spider mounted with freedom of rotation on one of said shafts; a differential gear train comprising a first gear positively mounted on said input shaft, an internal counter gear coaxial with and spaced from said first gear, and a floating idler gear engaged between said first gear and said counter gear mounted for rotation on said spider; means positively driving said counter gear from said output shaft in the direction opposite said first gear but at the same linear speed, whereby said floating differential gear is caused to be displaced proportionally to the relative displacement of said shafts; and means associated with said spider for indicating the movement thereof.

5. A torque responsive device comprising a stationary cylindrical housing, an input shaft and an axially aligned output shaft entering said housing, said shafts being resiliently coupled together to permit relative angular displacement proportional to the torque between the shafts; a spider mounted with freedom of rotation on one of said shafts; a differential gear train comprising a first gear positively mounted on said input shaft, an internal counter gear coaxial with and spaced from said first gear, and a floating idler gear engaged between said first gear and said counter gear mounted for rotation on said spider; means driving said counter gear in the direction opposite said first gear but at the same linear speed comprising a second gear positively mounted on said output shaft and an idler mounted on said housing and engaged between said second gear and said counter gear, whereby said floating differential gear is caused to be displaced proportionally to the relative displacement of said shafts; and a cylindrical flange carried by said spider and surrounding said counter gear, said flange and housing together forming a scale and index whereby the movement of the spider is indicated.

6. A torque responsive device comprising a stationary cylindrical housing, an input shaft and an axially aligned output shaft entering said housing, said shafts being hollow and resiliently coupled together by an elongated resilient member accommodated within said shafts to permit relative angular displacement proportional to the torque between the shafts; a spider mounted with freedom of rotation on one of said shafts; a differential gear train comprising a first gear positively mounted on said input shaft, an internal counter gear coaxial with and spaced from said first gear, and a floating idler gear engaged between said first gear and said counter gear mounted for rotation on said spider; means driving said counter gear in the direction opposite said first gear but at the same linear speed comprising a second gear positively mounted on said output shaft and an idler mounted on said housing and engaged between said second gear and said counter gear, whereby said floating differential gear is caused to be displaced proportionally to the relative displacement of said shafts; and a cylindrical flange carried by said spider and surrounding said counter gear, said flange and housing together forming a scale and index whereby the movement of the spider is indicated.

References Cited in the file of this patent

UNITED STATES PATENTS

| | | |
|---|---|---|
| 565,303 | Sellers | Aug. 4, 1896 |
| 1,839,354 | Spath | Jan. 5, 1932 |
| 1,950,142 | Hastings et al. | Mar. 6, 1934 |

FOREIGN PATENTS

| | | |
|---|---|---|
| 704,782 | Great Britain | Mar. 3, 1954 |